United States Patent [19]

Blanchard

[11] 4,302,196
[45] Nov. 24, 1981

[54] MARINE PROPULSION UNIT INCLUDING PROPELLER SHAFT THRUST TRANSMITTING MEANS

[75] Inventor: Clarence E. Blanchard, Kenosha, Wis.

[73] Assignee: Outboard Marine Corporation, Waukegan, Ill.

[21] Appl. No.: 5,991

[22] Filed: Jan. 24, 1979

[51] Int. Cl.³ .............................................. B63H 21/28
[52] U.S. Cl. ........................................ 440/75; 74/378; 192/21; 192/48.91; 308/175; 440/86
[58] Field of Search ................. 192/21, 48.91; 74/378; 308/174, 175, 232, 234; 440/75, 86, 900

[56] References Cited

U.S. PATENT DOCUMENTS

| | | | |
|---|---|---|---|
| 2,071,634 | 2/1937 | Irgens | 74/378 |
| 2,521,368 | 9/1950 | Hingerty, Jr. | 115/34 R |
| 3,168,359 | 2/1965 | Murphy | 308/174 |

*Primary Examiner*—Sherman D. Basinger
*Attorney, Agent, or Firm*—Michael, Best & Friedrich

[57] ABSTRACT

Disclosed herein is a marine propulsion device including a drive shaft housing mounted for vertical swinging movement about a horizontal axis relative to a boat, a propeller shaft rotatably mounted in the drive shaft housing and having an axis of rotation, and a propeller carried by the propeller shaft. The marine propulsion device also includes a first bevel gear mounted in the drive shaft housing and in coaxial relation to the propeller shaft, a second bevel gear mounted in the drive shaft housing and in coaxial relation to the propeller shaft, and a clutch mechanism for selectively drivingly connecting the bevel gears to the propeller shaft. The marine propulsion device also includes an annular thrust flange extending from the propeller shaft and for transmitting axial thrust from the propeller shaft to the drive shaft housing.

10 Claims, 2 Drawing Figures

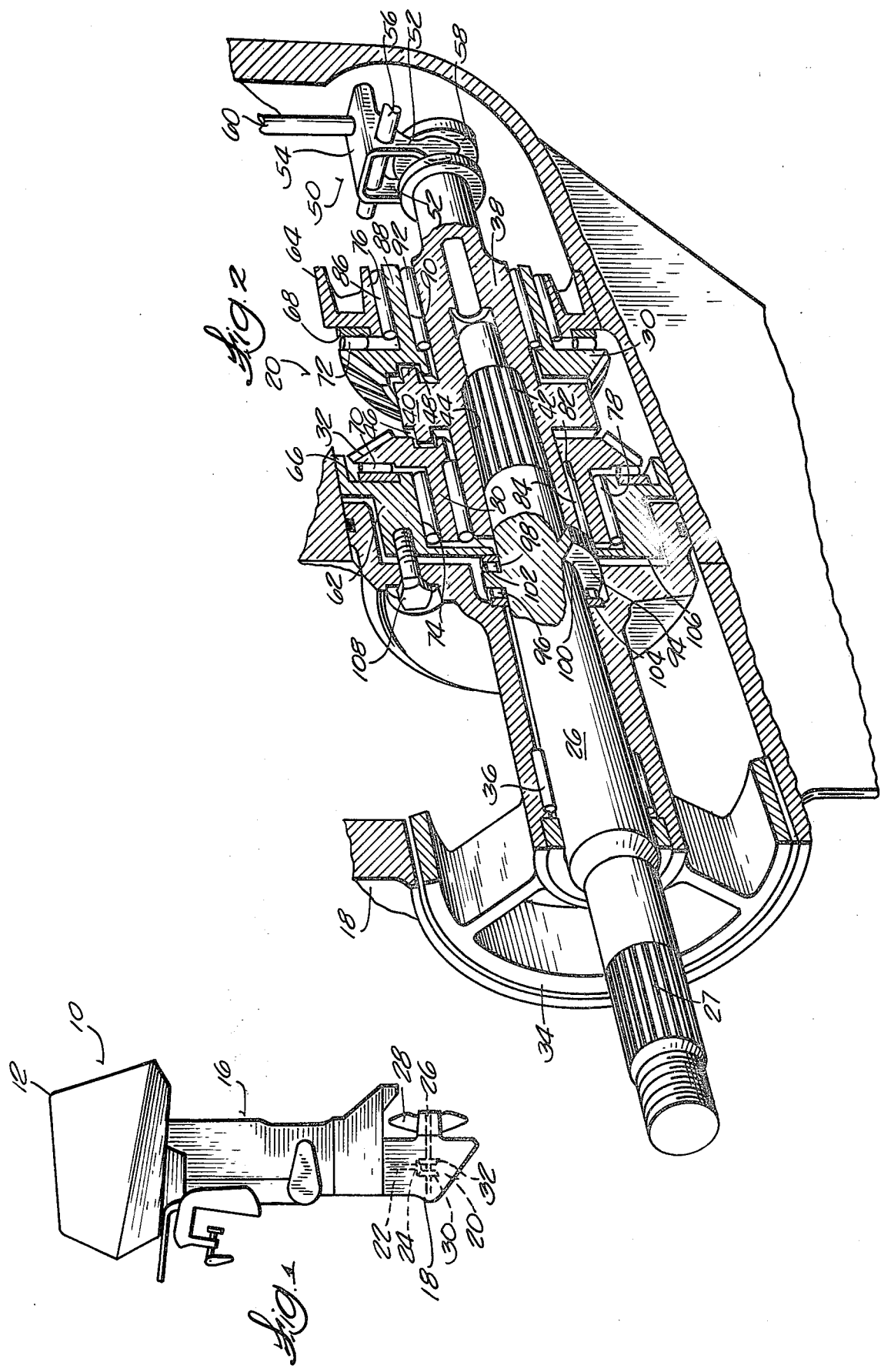

MARINE PROPULSION UNIT INCLUDING PROPELLER SHAFT THRUST TRANSMITTING MEANS

BACKGROUND OF THE INVENTION

The invention relates to marine propulsion devices such as outboard motors and more particularly to transmissions for marine propulsion devices and means therein for absorbing the propeller shaft thrust.

In those cases where a pair of outboard motors are employed in side-by-side relation, it is desireable to have counter-rotating propeller shafts to thereby reduce the steering torque generated by the propellers and to improve the overall handling of the boat. Accordingly, it is desireable to construct the gearcases in the lower units of such outboard motors such that the propeller shaft of one of the outboard motors can be driven in the counter-rotational direction without extensive structural modification of the lower unit or gearcase of that outboard motor.

Examples of prior art transmissions employed in marine propulsion devices are shown in the Kroll U.S. Pat. No. 3,842,788, issued Oct. 22, 1974; in the Shimanckas U.S. Pat. No. 3,818,855, issued June 25, 1974; and in the Shimanckas U.S. Pat. No. 3,882,814, issued May 13, 1975, each of those patents being assigned to the assignee of the present application.

Attention is also directed to the Bagge U.S. Pat. No. 3,727,574 issued Apr. 17, 1973; the Hingerty U.S. Pat. No. 2,521,368, issued Sept. 5, 1950; the Casale U.S. Pat. No. 3,154,047, issued Oct. 27, 1964; the Pichl U.S. Pat. No. 3,952,686, issued Apr. 27, 1976; and the Pichl U.S. Pat. No. 4,016,825 issued Apr. 12, 1977 showing transmission structures of marine propulsion devices.

Attention is also directed to the Rickley et al. U.S. Pat. No. 3,782,796, issued Jan. 1, 1974 and the Forster et al. U.S. Pat. No. 3,796,139, issued Mar. 12, 1974.

SUMMARY OF THE INVENTION

The invention includes a marine propulsion device having a drive shaft housing, means adapted for mounting the drive shaft housing for vertical swinging movement about a horizontal axis relative to a boat, a propeller shaft rotatably mounted in the drive shaft housing and having an axis of rotation, and a propeller carried by the propeller shaft. The marine propulsion device also includes a first bevel gear mounted in the drive shaft housing and in coaxial relation to the propeller shaft, a second bevel gear mounted in the drive shaft housing in coaxial relation to the propeller shaft, the second bevel gear being in spaced opposed relation with respect to the first bevel gear, and means for selectively drivingly connecting the bevel gears to the propeller shaft. The marine propulsion device further includes means for transmitting axial thrust from the propeller shaft to the drive shaft housing and including an annular thrust flange extending from the propeller shaft, the thrust flange having opposed surfaces spaced in the direction of the axis of rotation, the axial thrust transmitting means also including means supported by the drive shaft housing for engaging the opposed surfaces to prevent axial movement of the thrust flange and the propeller shaft with respect to the drive shaft housing.

One of the principal features of the invention is the provision in the marine propulsion device of a propeller shaft bearing housing fixedly supported within the drive shaft housing and including a first planar surface transverse to the axis of rotation, a gear bearing housing fixedly supported within the drive shaft housing and supporting one of the bevel gears, the gear bearing housing including a second planar surface transverse to the axis of rotation, the first and second planar surfaces housing the thrust flange therebetween and preventing movement of the propeller shaft in the direction of the axis of rotation.

Another of the principal features of the invention is the provision in the means for selectively drivingly connecting the bevel gears to the propeller shaft of a selector shaft rotatably mounted in the drive shaft housing for common rotation with the propeller shaft and for axial movement relative thereto, the selector shaft including a clutch dog movable axially with respect to the propeller shaft between a first position wherein the clutch dog is drivingly connected with one of the bevel gears, and a second position wherein the clutch dog is intermediate the bevel gears, and a third position wherein the clutch dog engages another of the bevel gears, and also the provision of means for selectively moving the selector shaft and the clutch dog axially with respect to the propeller shaft.

The invention also includes a marine propulsion device having a lower unit including a rotatably mounted drive shaft provided with a driving gear, a propeller shaft rotatably mounted in the lower unit and carrying a propeller, and one drive gear rotatably carried coaxially with the propeller shaft and disposed in meshing engagement with the driving gear. The marine propulsion device also includes means for selectively driving the propeller shaft, the driving means including a selector shaft rotatably mounted in the lower unit and connected to the propeller shaft for common rotation with the propeller shaft and for axial movement relative to the propeller shaft. One of the selector shaft and the propeller shaft has a splined axially extending bore housing a splined end of the other of the selector shaft and the propeller shaft in splined relation, whereby rotation of the selector shaft is imparted to the propeller shaft. The selector shaft also includes a clutch dog fixedly attached thereto and movable axially with respect to the propeller shaft between a first position wherein the clutch dog is drivingly connected with the drive gear and a second position wherein the clutch dog is disengaged from the drive gear. The means for selectively driving the propeller shaft also includes means for selectively moving the selector shaft and the clutch dog axially with respect to the propeller shaft.

One of the principal features of the invention is the provision in the marine propulsion device of a second drive gear rotatably carried coaxially with the propeller shaft and disposed in meshing engagement with the driving gear, the second drive gear being driven by the driving gear in a rotational direction opposite to that of the one drive gear.

Another of the principal features of the invention is the provision of the clutch dog including an annular flange fixedly extending from the selector shaft, the annular flange including opposed faces transverse to the axis of the propeller shaft, each of the faces supporting a dog for meshing with the drive gears.

The invention further includes a transmission comprising a housing, a driven shaft rotatably mounted in the housing and having a longitudinal axis, a drive gear mounted in the housing and in coaxial relation to the shaft and adapted for connection to a source of power, and means for selectively drivingly connecting the drive gear to the driven shaft. The transmission also includes means for transmitting axial thrust from the driven shaft to the housing, the thrust transmitting means including an annular thrust flange extending from the shaft. The thrust flange includes a pair of spaced opposed planar faces defining planes transverse to the longitudinal axis. The thrust transmitting means also includes a first planar wall in the housing extending transversely to the longitudinal axis of the driven shaft and a second planar wall in the housing and extending transversely to the longitudinal axis, the first and second planar walls housing the thrust flange therebetween and preventing movement of the driven shaft in the direction of the longitudinal axis.

Other features and advantages of the invention are set forth in the following description, in the drawings, and in the claims.

BRIEF DESCRIPTION OF THE DRAWINGS

FIG. 1 is a side elevational view of a marine propulsion device embodying the invention and incorporating a transmission in accordance with the invention.

FIG. 2 is an enlarged perspective view of the gear case of the marine propulsion device and with portions broken away to illustrate the transmission.

Before describing at least one embodiment of the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENTS

Shown in FIG. 1 is a marine propulsion device 10, such as an outboard motor, including a power head 12 which houses an internal combustion engine and a lower unit 16 having a gearcase 18 housing a reversible transmission 20. Extending through the lower unit 16 and operably connected to the internal combustion engine 14 is a drive shaft 22 carrying a bevel driving gear 24.

The transmission 20 includes a driven propeller shaft 26 which is journaled in the gearcase 18 and is disposed transversely of the drive shaft 22. The propeller shaft 26 extends from the gearcase 18 and, on its outer end 27, carries a propeller 28. Located within the gearcase 18 is a pair of facing, axially spaced bevel drive gears 30 and 32 which are rotatably carried on the propeller shaft 26 and mesh with the driving gear 24.

The propeller shaft 26 is rotatably supported in the gearcase 18 by a generally cylindrical bearing housing 34 suitably fixed to the lower unit 16 and supporting a bearing 36 therein, the bearing 36 rotatably supporting the propeller shaft 26.

The transmission 20 also includes means for alternatively and selectively connecting one of the spaced bevel driving gears 30 and 32 to the propeller shaft 26 for rotatably driving the propeller shaft. In a preferred embodiment, the connecting means includes a selector shaft or shiftable propeller shaft driver 38 having an integral annular dogged flange 40 intermediate its opposite ends, the dogged flange 40 alternatively and selectively engageable with the spaced bevel driving gears 30 and 32. More specifically, the selector shaft 38 is splined to the propeller shaft 26 for rotation with the propeller shaft and for axial movement with respect to the propeller shaft whereby the dogged flange 40 can move between the beveled gears 30 and 32 for selective engagement therewith. In the illustrated construction, the propeller shaft 26 includes one end 42 having external splines thereon and the selector shaft 38 includes an elongated central bore 44 in one of its ends, that bore having internal splines which mesh with the external splines on the propeller shaft end 42 whereby that end of the propeller shaft 36 is supported in the central bore 44 of the selector shaft and is rotatably driven by rotation of the selector shaft 38. It should be understood that the propeller shaft 26 and the selector shaft 38 could be similarly joined in splined relation for common rotation if the selector shaft 38 included external splines on one end thereof and if the propeller shaft included a splined axially extending bore for housing the splined end of the selector shaft.

The integral dogged flange 40 of the selector shaft 38 includes a pair of opposed faces 46 and 48 perpendicular to the axis of rotation of the propeller shaft 26, and each of the faces 46 and 48 supporting one or more driving lugs which are arranged to engage complementary driving lugs on the respective drive gears 30 and 32.

Means are also provided for selectively shifting the selector shaft 38 in the direction of the axis of rotation of the propeller shaft 26 to thereby move the dogged flange 40 into selective engagement with the bevel driving gears 30 and 32. While various constructions can be provided, in the illustrated construction, the means for shifting the selector shaft 38 includes a bellcrank 50 supported for pivotal movement by a pivot pin 56 in turn supported by the gear case 18. The bellcrank 50 includes a pair of parallel spaced lever arms 52 positioned on opposite sides of the selector shaft 38, and the free ends of the lever arms 52 are housed in a groove 58 surrounding the end of the selector shaft 38. A control rod 60 is attached to the free end of the other lever arm 54 of the bellcrank 50. Vertical movement of the control rod 60 thus causes pivotal movement of the bellcrank 50 about the pivot pin 56 and axial movement of the selector shaft 38.

Means are also provided for supporting the bevel driving gears 30 and 32 for rotation about the axis of the propeller shaft 26. In the illustrated construction, such means includes a pair of longitudinally spaced apart bearing housings 62 and 64 each fixedly mounted in the gearcase 18. The bearing housings 62 and 64 include opposed facing annular surfaces 66 and 68, respectively, the surfaces 66 and 68 supporting thrust bearings 70 and 72. The bearing housings 62 and 64 also include internal bores 74 and 76, respectively. The internal bore 74 of bearing housing 62 houses a roller bearing 78, and the roller bearing 78 in turn supports a hollow cylindrical flange 80 of the bevel gear 32. The internal surface 82 of the cylindrical flange 80 of the bevel gear 32 similarly houses a roller bearing 84 surrounding the end of the selector shaft 38. The internal bore 76 of the bearing housing 64 houses a roller bearing 86 which in turn supports an integral hollow cylindrical flange 88 of the bevel gear 30. The internal surface 90 of the cylindrical flange 88 of the bevel gear 30 similarly houses a roller bearing 92 surrounding an end of the selector shaft 38 opposite that end supported by the bearing 84.

Means are also provided for translating axial thrust on the propeller shaft 26 to the lower unit 16, the thrust translating means being independent of the bevel drive gears 30 and 32. The thrust translating means includes an annular thrust flange 94 surrounding the propeller shaft 26 and supported against movement in the direction of the axis of the propeller shaft 26 by a pair of thrust bearings 96 and 98 positioned on opposite sides of the thrust flange 94. More particularly, in the illustrated construction, the annular thrust flange 94 is integrally joined to the propeller shaft 26 and includes opposed planar annular faces 100 and 102 perpendicular to the axis of the propeller shaft 26. The thrust bearings 96 and 98 are clampingly engaged between an end wall 104 of the propeller shaft bearing housing 34 and an opposed end wall 106 of the bearing housing 62 to thereby prevent axial movement of the propeller shaft. The propeller shaft bearing housing 34 and the bearing housing 62 are secured together by bolts 108.

In operation, any axial thrust on the propeller shaft 26 is translated to the lower unit housing 16 through the annular thrust flange 94 and thrust bearings 96 and 98 rather than through the annular dogged flange 40 and the bevel drive gears 30 and 32. Accordingly, the bevel drive gears 30 and 32 function only to impart rotational movement to the propeller shaft 26, and the propeller shaft 26 can be driven in either rotational direction with equal facility.

Another of the advantages of the structure in FIG. 2 is that the propeller shaft driving mechanism and the means embodied in the invention for selectively drivingly connecting the drive shaft 22 to the propeller shaft 26 is simpler than a conventional selector mechanism and requires fewer moving parts than those previously employed.

Various features of the invention are set forth in the following claims.

What is claimed is:

1. A marine propulsion device comprising a lower unit having a rotatably mounted drive shaft provided with a driving gear, a propeller shaft rotatably mounted in said lower unit and carrying a propeller, a drive gear rotatably carried coaxially with said propeller shaft and disposed in meshing engagement with said driving gear, a selector shaft mounted in said lower unit for rotation and for axial movement relative to said lower unit, one of said selector shaft and said propeller shaft having a splined end and the other of said selector shaft and said propeller shaft having a splined axially extending bore housing said splined end in splined relation whereby rotation of said selector shaft is imparted to said propeller shaft, and said selector shaft including an annular flange having an inner diameter and being integral with said selector shaft at said diameter, said flange also having thereon clutch dog means, said selector shaft being movably axially between a first position wherein said clutch dog means is drivingly connected with said drive gear and a second position wherein said clutch dog means is disengaged from said drive gear, and means for selectively axially moving said selector shaft.

2. A marine propulsion device as set forth in claim 11 and further including a second drive gear rotatably carried coaxially with said propeller shaft and disposed in meshing engagement with said driving gear, said second drive gear being driven by said driving gear in a rotational direction opposite to that of said first mentioned drive gear.

3. A marine propulsion device as set forth in claim 2 wherein said annular flange includes opposed faces transverse to the axis of said propeller shaft, each of said faces supporting a dog for meshing with said drive gears.

4. A marine propulsion device as set forth in claim 2 wherein said means for selectively moving said selector shaft includes a bellcrank pivotably supported by drive shaft housing and including a first lever arm connected to said selector shaft and a second lever arm transverse to said first lever arm, and means for pivoting said bellcrank attached to said second lever arm.

5. A transmission comprising a housing, a driven shaft rotatably mounted in said housing and having a longitudinal axis, a drive gear mounted in said housing and in coaxial relation to said shaft and adapted for connection to a source of power, a selector shaft mounted in said housing for rotation and for axial movement relative thereto, said selector shaft including an annular flange having an inner diameter and being integral with said selector shaft at said inner diameter, said flange also having thereon a clutch dog, said selector shaft being movable axially between a first position wherein said clutch dog is drivingly connected with said drive gear and a second position wherein said clutch dog is spaced from said drive gear, one of said selector shaft and said driven shaft including a splined axially extending bore and the other of said selector shaft and said driven shaft including a splined end housed in said splined axially extending bore in splined connection therewith so as to provide common rotation of said selector shaft and said driven shaft, means for selectively axially moving said selector shaft, and means for transmitting axial thrust from said driven shaft to said housing and including an annular thrust flange extending from said shaft, said thrust flange including a pair of spaced opposed planar faces defining planes transverse to said longitudinal axis, a first planar wall in said housing extending transverse to said longitudinal axis and a second planar wall in said housing extending transverse to said longitudinal axis, said first and second planar walls housing said thrust flange therebetween and preventing movement of said driven shaft in the direction of said longitudinal axis.

6. A marine propulsion device comprising a drive shaft housing, means adapted for mounting said drive shaft housing for vertical swinging movement about a horizontal axis relative to a boat, a propeller shaft rotatably mounted in said drive shaft housing and having an axis of rotation, a propeller carried by said propeller shaft, a first bevel gear mounted in said drive shaft housing in coaxial relation to said propeller shaft, a second bevel gear mounted in said drive shaft housing in coaxial relation to said propeller shaft, said second bevel gear being in spaced opposed relation with respect to said first bevel gear, a selector shaft mounted in said drive shaft housing for rotary and axial movement relative thereto, said selector shaft including an annular flange having an inner diameter and being integral with said selector shaft at said inner diameter, said flange also having thereon clutch dog means, said selector shaft being movable axially between a first position wherein said clutch dog means is drivingly connected with one of said bevel gears, and a second position wherein said clutch dog means is intermediate said bevel gears, and a third position wherein said clutch dog means engages the other of said bevel gears, one of said selector shaft and said propeller shaft including a splined end and the other of said selector shaft and said propeller shaft including an end having a splined axially extending bore, said splined end being housed in said splined axially extending bore in splined connection therein, whereby rotation of said selector shaft causes rotation of said propeller shaft, means for selectively axially moving said selector shaft, and means for transmitting axial thrust from said propeller shaft to said drive shaft housing independently of said bevel gears and including an annular thrust flange extending from said propeller shaft, said thrust flange having opposed surfaces spaced in the direction of said axis of rotation, said axial thrust transmitting means also including means supported by said drive shaft housing for engaging said opposed surfaces of said thrust flange to prevent axial movement of said propeller shaft with respect to said drive shaft housing.

7. A marine propulsion device as set forth in claim 6 wherein said means for engaging said opposed surfaces of said thrust flange includes a propeller shaft bearing means fixedly supported within said drive shaft housing and including a first planar surface transverse to said axis of rotation, a gear bearing housing fixedly supported within said drive shaft housing and supporting one of said bevel gears, said gear bearing housing including a second planar surface transverse to said axis of rotation, said first and second planar surfaces housing said thrust flange therebetween and preventing movement of said propeller shaft in the direction of said axis of rotation.

8. A marine propulsion device as set forth in claim 6 wherein said annular flange includes opposed faces each transverse to said axis of rotation, each of said faces supporting a dog for selectively meshing with said bevel gears whereby said flange and said selector shaft can be rotatably driven by said bevel gears.

9. A marine propulsion device as set forth in claim 6 wherein said means for selectively moving said selector shaft includes a bellcrank pivotably supported by said drive shaft housing and including a first lever arm connected to said selector shaft and a second lever arm transverse to said first lever arm, and means attached to said second lever arm for pivoting said bellcrank.

10. A marine propulsion device as set forth in claim 6 wherein said opposed faces of said thrust flange extend in planar relation transverse to said axis of rotation.

* * * * *